A. LUQUET.
Ageing Wines and Liquors.
No. 136,741.                    Patented March 11, 1873.
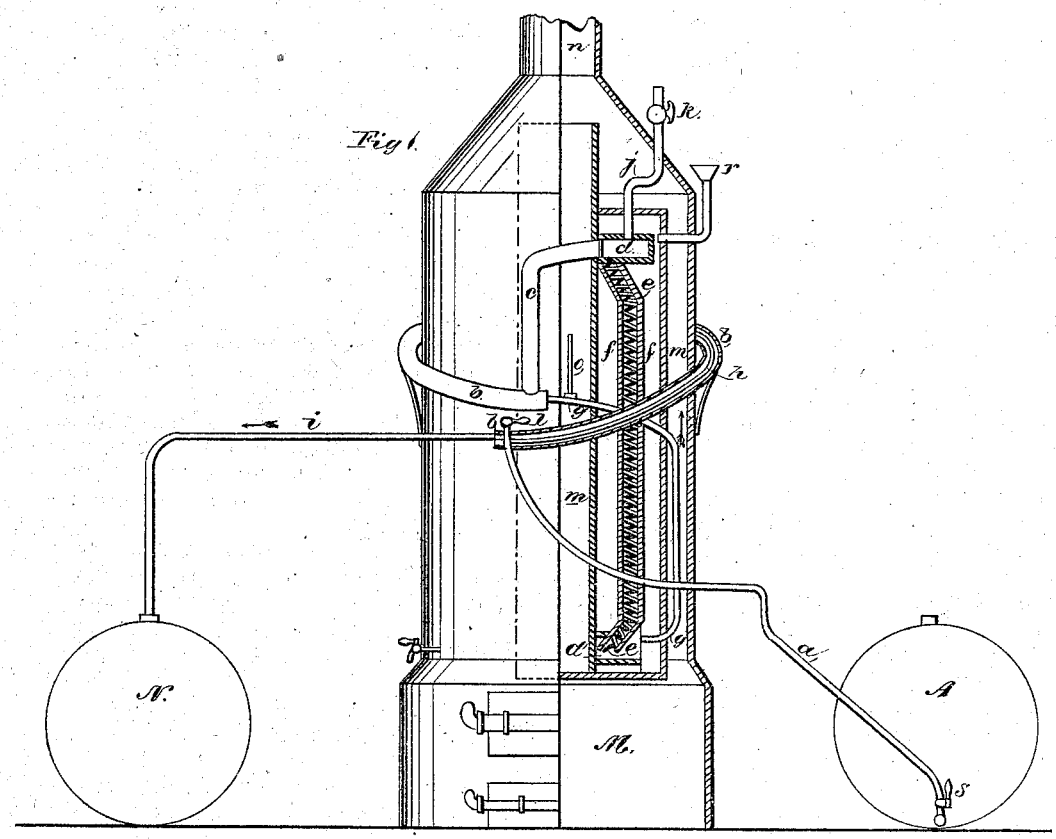

UNITED STATES PATENT OFFICE.

ADOLPH LUQUET, OF SAN FRANCISCO, CALIFORNIA.

IMPROVEMENT IN AGING WINES AND LIQUORS.

Specification forming part of Letters Patent No. 136,741, dated March 11, 1873.

*To all whom it may concern:*

Be it known that I, ADOLPH LUQUET, of the city and county of San Francisco, State of California, have invented an Improved Apparatus and Process for Imparting Age to Wines and Liquors; and I do hereby declare that the following is a full, clear, and exact description of the same, reference being had to the accompanying drawing and letters marked thereon.

My invention relates to an improved device and apparatus for improving wines and giving all the results of age and the attending improved flavor; and it consists mainly in withdrawing the wine from a cask under the pressure of air, and passing it through a peculiarly-shaped heating furnace, tank, or coil, and thence through a cooling coil or pipe, after which it is passed to the receiving-cask, as will hereinafter more fully appear.

Referring to the drawing for a more complete explanation of my invention, Figure 1 is a sectional view of the apparatus with its connecting-pipe.

A represents a cask containing the wine to be treated, which is forced out by a condensing-pump forcing air into a cask, by which the wine is conveyed, by a pipe, $a$, into an outer pipe, $b$, of a double coil, which surrounds the apparatus. From thence it passes through a pipe, $c$, into a chamber, $d$, and down through a serpentine coil of pipe, $e$. This coil is surrounded by a double wall, which in turn is surrounded by water-spaces $ff$. A pipe, $g$, leading from the lower chamber $d'$ conveys the wine, after it has passed through the serpentine coils, up into the inner pipe $h$, surrounded by the outer coil $b$, above described, to the exit-pipe $i$. From the upper chamber $d$ extends an escape-pipe, $j$, which is provided with a cock, $k$. A cock, $l$, is also attached to the pipe $a$ near its connection with the coil $b$, so that the flow of wine from the cask A may be regulated, as this is a very important feature of my invention. The outer spaces $m\ m$ are for the circulation of the heat from the furnace, and the smoke passes out of the flue or chimney $n$. A thermometer, $o$, is attached to the pipe $g$ near the point from which the said pipe connects with the pipe $h$, so that the temperature of the heated wine may be observed at all times during the process.

In operating with my device, the water-spaces $ff$ being filled, fire is kindled in the furnace M and allowed to burn for the space of fifteen minutes, or until the water is heated to a sufficient degree, which will be indicated by steam escaping from the pipe or jet $r$, when the cock $s$ of the cask and the cock $l$ at the end of the pipe $a$ are opened and the air-pump set in motion, which causes the wine to pass up through the pipe $a$ into the outer pipe $b$ of the double coil, which rushes on and around through the pipe until it arrives at the pipe $c$, from whence it passes into the serpentine coils, and up from the chamber at their base, through the pipe $g$, and into the cooling-pipe $h$, which is surrounded by the pipe $b$ containing cold wine, making a complete circuit, in which condition it is received into the cask N through the pipe $i$, connected to the pipe $h$.

Care should be exercised or too great a degree of heat will be generated by the fire, and the wine be raised to a high temperature, and the state of the thermometer should be carefully watched in order to avoid this.

If the wine acted upon, however, is liable to become too hot, the cock $l$ may be opened and a greater flow or stream may be forced through the pipes, which will have the tendency to cool the contents of the apparatus; so, also, if the contents of the apparatus be brought to a low temperature the cock $l$ is closed partially or wholly until the temperature is raised.

It will here be seen that the cock $l$ and thermometer are two important auxiliaries for the perfect carrying out of my process. It will also be observed that the wine in the coils is completely surrounded by water at the sides, top, and bottom, while the whole is enveloped and surrounded by the fire and heat from the furnace, which imparts rapidly to the wine a beneficial effect, which cannot be attained by any other process.

Having thus described my invention, what I claim, and desire to secure by Letters Patent, is—

1. The process herein described of treating wines by forcing it through coils or pipes surrounded by heated water, and through a cooling-pipe, $h$, surrounded or inclosed by a pipe, $b$, containing cold wine, as set forth and described.

2. In combination with the apparatus, consisting of coils $e\ e$ and water-spaces $f\ f$, the double outer coil $b$ and $h$, as set forth and specified.

In witness whereof I have hereunto set my hand and seal.

A. LUQUET. [L. S.]

Witnesses:
  C. W. M. SMITH,
  FRANÇOIS PAVIE.